United States Patent [19]

Stone, Jr.

[11] Patent Number: 4,473,003
[45] Date of Patent: Sep. 25, 1984

[54] AUTOMATIC DRIP COFFEE MAKER

[75] Inventor: Wayne B. Stone, Jr., Bethesda, Md.

[73] Assignee: Wood Manufacturing Co., Inc., Flippin, Ark.

[21] Appl. No.: 459,111

[22] Filed: Jan. 19, 1983

[51] Int. Cl.³ .......................................... A47J 31/00
[52] U.S. Cl. ........................................ 99/305; 99/285
[58] Field of Search ................. 99/295, 279, 294, 299, 99/300, 304, 305, 307, 309, 316, 280, 281, 282, 283, 285; 426/433

[56] References Cited

U.S. PATENT DOCUMENTS

| | | | |
|---|---|---|---|
| 3,385,201 | 5/1968 | Martin | 99/295 |
| 3,443,508 | 5/1969 | Reynolds | 99/305 |
| 3,513,767 | 5/1970 | Bloomfield | 99/307 |
| 3,771,432 | 11/1973 | Karlen | 99/307 |
| 4,094,233 | 6/1978 | Martin | 99/305 |

*Primary Examiner*—Robert W. Jenkins
*Attorney, Agent, or Firm*—Beveridge, DeGrandi & Kline

[57] ABSTRACT

Conventional automatic drip coffee makers require about one minute of manual involvement to commence a brewing cycle.

The automatic drip coffee maker herein disclosed makes a full decanter of coffee within 1½-2 minutes following the one minute manual involvement.

The automatic drip coffee maker of the present invention uses preheated water but only the amount required for a decanter of coffee (½ gallon) making it unnecessary to employ a large reservoir. The concept, in a preferred embodiment, is to commence the brewing cycle by an almost instantaneous dump of the preheated water to a transfer tank which, in turn, meters heated water to the grounds at such a rate as to insure almost immediate contact between all the coffee grounds and all the hot water. The dump time for preheated water from the preheated reservoir to the transfer tank is less than the time required to fill a receptacle with cold water. Thus by the time cold water addition may be made to the automatic drip coffee maker, the preheat tank is empty and coffee is in the process of being brewed.

9 Claims, 8 Drawing Figures

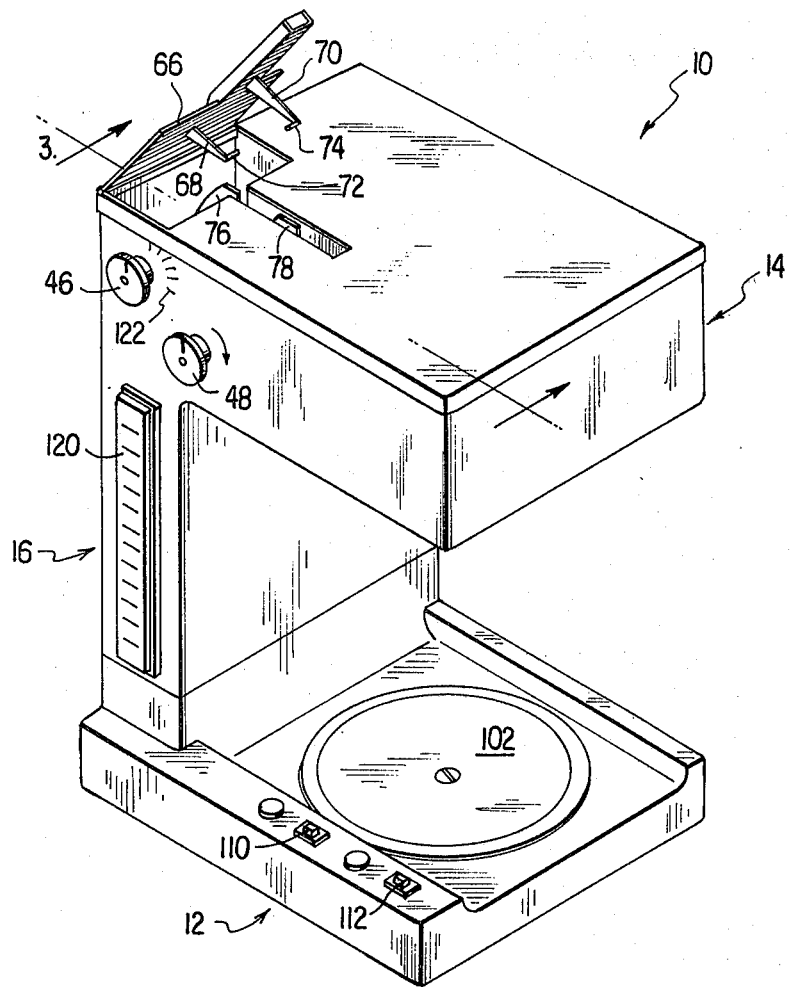

AUTOMATIC DRIP COFFEE MAKER

BACKGROUND OF THE INVENTION

The invention relates to automatic drip coffee makers.

A drip coffee maker is one in which coffee brew is obtained by a single pass of hot water through a quantity of coffee grounds. The hot water flow to and through the coffee grounds may be intermittent or continuous but the entire quantity of water flows through the grounds only once as opposed to a recirculating flow characteristic of percolator type coffee makers.

In the case of a typical, non-automatic drip coffee maker; coffee grounds are placed in the coffee maker, and water is heated in a separate container, such as a tea kettle, from which hot water is subsequently poured into the drip coffee maker. Manual involvement is always required at two time spaced intervals (to start the heating of the water and pouring of the same into the coffee maker approximately seven minutes later); and, in most cases, there is a third required involvement which is the placement of the coffee maker on a "keep warm" element shortly after the coffee is brewed.

In contrast, an automatic drip coffee maker is a self contained unit which heats water, flows the same across coffee grounds and keeps the brewed coffee hot. The only manual involvement is that which takes place at one point in time, i.e. commencing a brewing cycle by adding coffee grounds and water to the maker and energizing the same. The manual time requirement to commence a brewing cycle is about one minute. Completion of the brewing cycle may take from 2½ to 15 minutes depending on the type automatic drip coffee maker employed.

Automatic drip coffee makers may, on the basis of their heated water flow systems, be categorized as being of the intermittent pumping, weir overflow or preheated displacement type.

INTERMITTENT PUMPING TYPE

In this type coffee maker, small quantities of cold water are successively withdrawn from a reservoir, heated and pumped to a filter basket containing coffee grounds. The outlet coffee flow from the filter basket into a serving decanter is, similarly, intermittent. Coffee brew time for a conventionally sized, half gallon decanter of coffee will vary from 8 to 15 minutes depending upon the heater wattage employed which, typically, falls within a range of 750–1500 watts.

An inherent characteristic of the intermittent pumping type coffee maker is that it may be relatively small since the water reservoir therefor need not hold more than approximately one half gallon. Furthermore, because a pump is employed, the reservoir need not overlie the filter basket for gravity flow thus allowing the positionment of the same in the vertical standard, below the filter basket, to ensure a low center of gravity. This permits a wide variety of aesthetic design approaches within a stable, slim appliance profile. The component parts of a pumping drip coffee maker are relatively inexpensive and this, combined with the relatively small amount of plastic or other housing material required for the slim profile appliance, allows this type coffee maker to be sold at a price competetive with other, non-drip type coffee makers, such as electric percolators.

The advantages of the pumping type drip coffee maker are, then; small size, low cost and a low center of gravity permitting a wide variety of design approaches.

The primary disadvantage in this type coffee maker is the required brewing time. A second disadvantage is the quality of the coffee brewed in the intermittent fashion described above.

WEIR OVERFLOW TYPE

In this type drip coffee maker, cold water is poured into a pan overlying a tank having a rod heater element and a weir therein. The cold water flows continuously, by gravity, into the underlying tank where it is heated by the rod heater before it overflows the weir from which the heated water flows by gravity into an underlying filter basket.

As compared with a pumping type coffee maker, the weir overflow type has one advantage and several disadvantages.

The advantage is speed. Brew time is approximately 5 minutes using a maximum wattage heater.

The disadvantages are:
(1) The coffee quality is poor. Upon start-up, the initial cold water flow into the heating tank is such that the initial water flowing across the weir has not been brought up to proper brewing temperature. The majority of coffee flavor is obtained at initial brewing contact and since the initial contact is by water below the correct brewing temperature the coffee quality is below that which is obtainable when all the water passing through the coffee grounds is at the correct temperature.
(2) The design appearance is, necessarily, cumbersome and ungainly. Since the inpour pan must have a one half gallon capacity and the underlying heating tank must have at least half the pan capacity plus the heater element and electrical controls; and since all of these must overlie the filter basket for successive gravity flows from the pan to tank and tank to basket it is apparent that the unit will not only appear top heavy but will, in fact, have a high center of gravity which must be compensated for in some fashion. Usually, this compensation takes the form of a large base and a large vertical standard to support the tank and pan.
(3) The appliance life time is short. The use of a maximum wattage heater is critical to this operational mode and, as with all appliances, the operational life of a heater element varies inversely with the wattage.

PREHEATED DISPLACEMENT TYPE

In this type drip coffee maker, a large quantity of water is preheated and thermostatically maintained at correct brewing temperature. To make coffee, a quantity of cold water is introduced, via a holding pan and inlet tube, to the bottom of the preheated water whereupon an equal quantity of the preheated water is displaced from the top thereof, via an outlet tube, to flow to an underlying filter basket.

The quantity of preheated water is necessarily large as compared with the quantity of cold water to be added to the bottom of the preheated water to insure that the displaced, preheated water is not cooled by the cold water addition. Typically, the ratio of preheated water to cold water addition is 3:1. The capacity of the preheat water tank would thus be 1½ gallons while that of the holding pan is ½ gallon. The total required water capacity that must be accomodated within the appliance housing is, then, 2 gallons.

This type coffee maker, when new, has two distinct advantages over other automatic drip coffee makers; speed and brew quality. An unusually large filter basket is typically employed and the hot water is introduced at such a rate that the coffee grounds are literally floated in a large quantity of hot water. The inpour rate to the filter basket and the outflow rate therefrom (as metered by the size of the inflow and outflow openings) is such as to insure that the hot water/coffee suspension is just short of overflowing the filter basket until all the hot water has been introduced. The key to the superior coffee quality is that the initial brewing contact is between a large body of water at correct brewing temperature and all of the coffee grounds. A through flow time of approximately 2½ minutes is obtainable with this type coffee maker.

In contrast, however, both coffee quality and brew time deteriorate with usage. Because it is necessary to meter the hot water outflow to the filter basket to prevent overflowing the same the outflow tubing must be fairly small, as on the order of ¼" OD. The cold water inflow tube which introduces cold water to the bottom of the preheated water is similarly sized. Both of these tubes are quite long and constantly heated. Mineral deposits thus quickly build up resulting in a lesser inflow rate to the filter basket with a subsequent increase in brew time (up to 4½ minutes is typical) and a slight lessening of coffee quality as the coffee ground suspension action, discussed above, is decreased. Of greater concern to brew quality is the break up of these mineral deposits and their subsequent delivery to the serving decanter as is readily apparent from visual inspection of a serving decanter that has been in use for some time. Althought it is possible to ream these tubes with a long "snake" and again achieve the faster brewing time the offset is that the reamed mineral particles fall into the preheat tank. Of more importance to brew quality is the fact that "old" water is used to make the coffee. If several gallons of coffee are made daily, this is of little concern but if only one or two half gallon containers are made daily, the user will be making coffee with water that has been constantly heated for one or two days.

Notwithstanding the foregoing, brew times are shorter and brew quality is superior to other automatic drip coffee makers.

The primary disadvantages are cost, size and initial brewing time from a cold start before the water is preheated. The size, alone, of the appliance profile necessary to have a 2 gallon capacity along with the electrical controls creates a substantial difference in cost as compared with other coffee makers. It is also necessary that the housing be quite tall since the concept of operation requires a "stratification" of cold water introduced to the bottom of the preheated water to displace the same from the upper volume thereof without mixing. Also contributing to greater cost is insulation for the preheat tank, the necessarily heavier rod heater to preheat and maintain 1½ gallons of water as compared with the ½ gallon for other coffee makers and the required thermostatic controls. On initial start up, such as when the unit is first turned on in the morning, the first coffee cannot be made until the 1½ gallons of water is preheated which takes about 35 minutes.

Because of its necessary bulk and height, this type coffee maker requires a large amount of counter space and does not lend itself to the aesthetic designs possible with smaller coffee makers.

COMPARISON

From the foregoing, it will be seen that the attributes of the various automatic drip coffee makers (ADCs) break down as follows:

| ADC TYPE | SIZE | COST | BREW TIME | BREW QUALITY | AESTHETICS |
|---|---|---|---|---|---|
| intermittent pumping | small | low | slow | fair | good |
| weir overflow | medium | low | medium | poor | poor |
| preheated displacement | large | high | fast | good | poor |

It is the purpose of the present invention to combine the more desirable of the above tabulated attributes in a single, automatic drip coffee maker.

More specifically, the automatic drip coffee maker herein disclosed is of the same small size and low cost as the intermittent pumping type and has a very fast brew time (2½ minutes per half gallon)(1½–2 minutes "waiting" time following manual involvement) to deliver an excellent brew quality.

SUMMARY OF THE INVENTION

As stated above, an automatic drip coffee maker (ADC) is one in which manual involvement takes place at only one point in time. That is the time period during which coffee grounds and cold water are added to the ADC. In most ADCs an electrical circuit is energized during this "start-up" time period although in the preheated displacement type, the heater circuits are continuously energized. Thus, a common factor of all ADCs is the addition of coffee grounds and water with the commencement of the brew cycle being initiated either by the energization of a heating circuit or as a function of having added cold water as in the displacement type. In any event, the commencement of the brewing cycle cannot take place before the cold water addition. Conversely, it is an important distinction in a preferred mode of operation of the present invention that the brew cycle be initiated prior to the addition of cold water.

The manual involvement referred to above normally requires about one minute with 20–30 seconds of that time being required to fill a receptacle with the cold water to be added to the ADC. In a preferred embodiment of the present invention it is the operation of the ADC within that 20–30 second interval required to fill a receptacle with cold water that is important.

Briefly, in accordance with a preferred mode of operation; coffee grounds are added, the brew cycle is next started and, thereafter, cold water is added as opposed to conventional ADCs in which the brew cycle is not started before cold water is added. In either event, the required time period of manual involvement (about one minute) is the same.

The ADC of the present invention uses preheated water but only the amount required for a decanter of coffee (½ gallon) making it unnecessary to employ a large reservoir. The concept, in a preferred embodiment, is to commence the brewing cycle by an almost instantaneous dump of the preheated water to a transfer tank which, in turn, meters heated water to the grounds at such a rate as to insure almost immediate contact between all the coffee grounds and all the hot water. The dump time for preheated water from the preheat tank to the transfer tank is less than the time required to fill a receptacle with cold water when the user is necessarily away from the ADC. Thus by the time cold water addition may be made to the ADC, the preheat tank is empty and coffee is in the process of being brewed.

In a preferred embodiment, the cold water addition is made to a cold water reservoir in the vertical standard supporting the preheat reservoir from whence the cold water is heated and intermittently pumped to the preheat reservoir where it is kept preheated awaiting the next brew cycle.

Although the primary purposes of the present invention are met by adding the cold water directly to the preheat reservoir rather than pumping the same thereto, there are economic advantages in using the standard, relatively cheap, pumping units that are readily available and require no connections through the wall of the preheat reservoir as would be the case if a sufficient wattage heater were positioned therein to bring cold water up to correct brewing temperature. Once the elevated temperature is achieved by the pumping unit; a small, economical rope heater simply attached to the under surface of the preheat reservoir is sufficient to maintain the elevated temperature. Another important reason for cold water addition to a separate cold water reservoir is to facilitate the making of less than a full decanter of coffee and to insure that if less than a full decanter of coffee is made on successive occassions there will be no stale, or old, water build-up.

Another reason for cold water addition to a separate reservoir has to do with the required fast dump time from the preheat reservoir. If all the preheated water may be dumped (the preheat tank completely drained) each time coffee is made, then the dump valve may be so positioned (at a level beneath the reservoir base) as to provide maximum head pressure for the dump. It is an important aspect of the invention that this transfer of preheated water is by way of gravity flow through a dump valve as opposed to a syphon flow characteristic of displacement type ADCs.

The dump valve construction, position, and mode of operation is an important facet of the invention, primarily from the standpoint of cost and secondarily as a function of the fast flow rate that may be had. The former for obvious reasons and the latter to insure a sufficiently fast introduction of hot water to the coffee grounds to substantially, instantaneously expose all the coffee grounds to all of the water. The immediate, or almost instantaneous, exposure is the key to making the best possible coffee from the coffee grounds and water available.

The dump valve is nothing but an open ended bent tube, sealed and journalled by an O ring, that is rotatable through 90°.

In those use conditions where only one decanter of coffee will be made in a day, the ADC herein disclosed is readily convertible to an intermittent pumping type coffee maker.

DESCRIPTION OF THE DRAWINGS

FIG. 1 is a perspective view of the new automatic drip coffee maker (ADC) with the cold water inpour door shown partly raised to illustrate details;

FIGS. 2A, 2B and 2C are schematic illustrations to show the water flow path within the ADC;

DESCRIPTION OF THE PREFERRED EMBODIMENT

Figure 3:
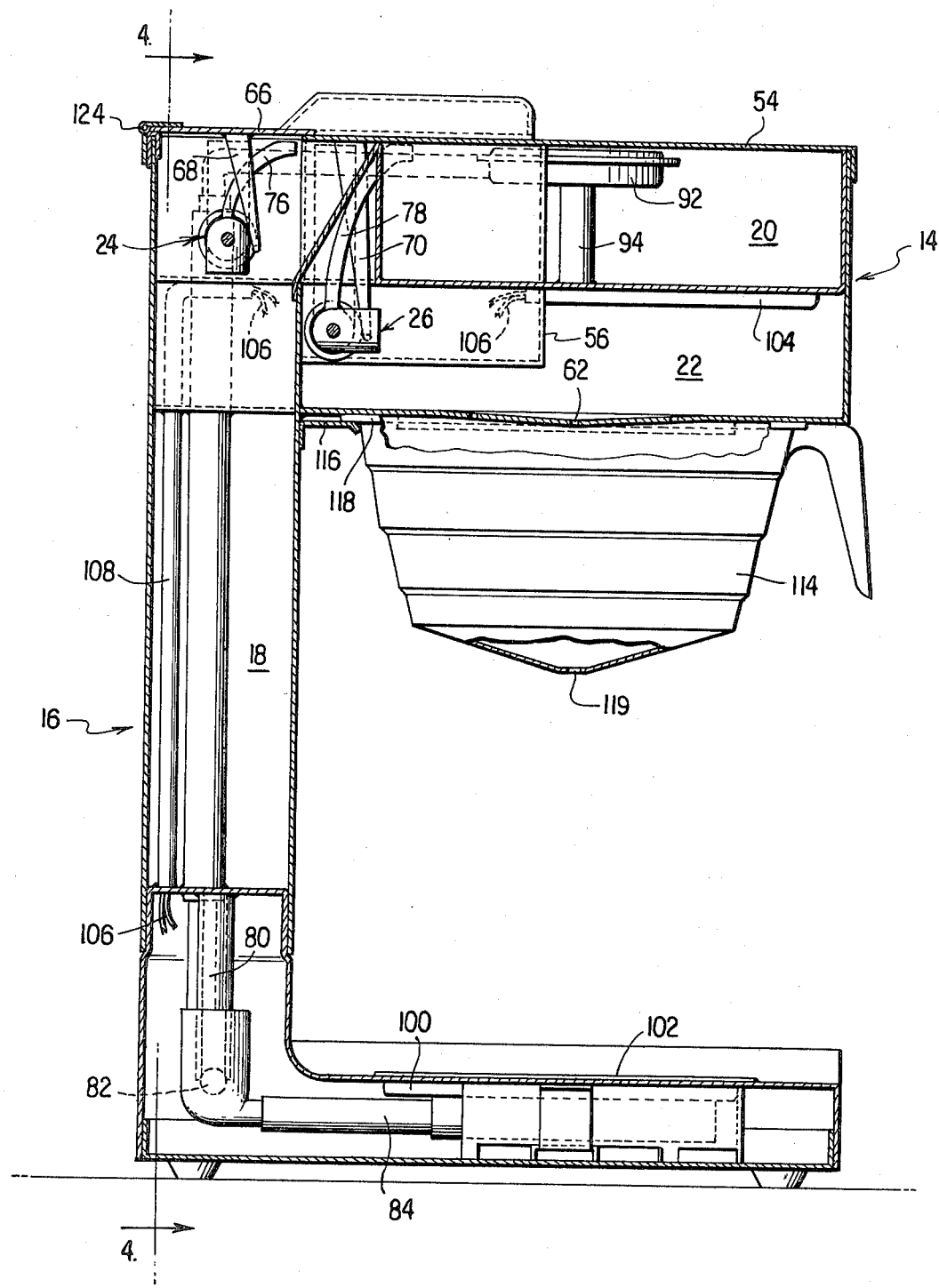
FIG. 3 is a vertical section, with parts in elevation, taken along line 3—3 of FIG. 1 but with the inpour door shown closed.

In FIG. 1 is illustrated an automatic drip coffee maker 10 whose base 12 supports an upper housing 14 through the intermediary of a vertical housing or standard 16. A cold water reservoir 18 is contained within vertical housing 16 while housing 14 is divided into an upper, preheat tank 20 and a lower transfer tank 22.

Figure 4:
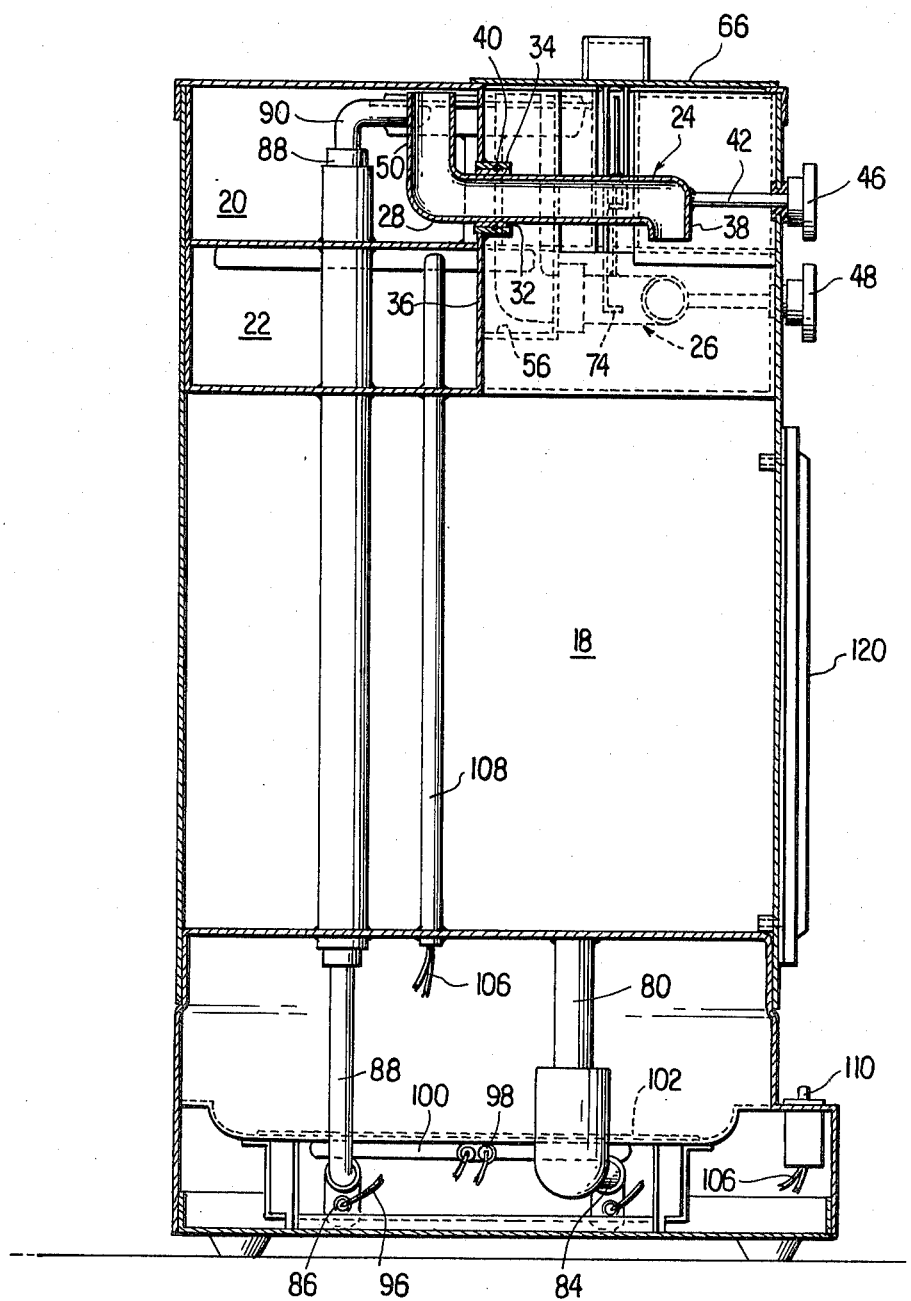
FIG. 4 is a vertical section taken along line 4—4 of FIG. 3.
Figure 5:
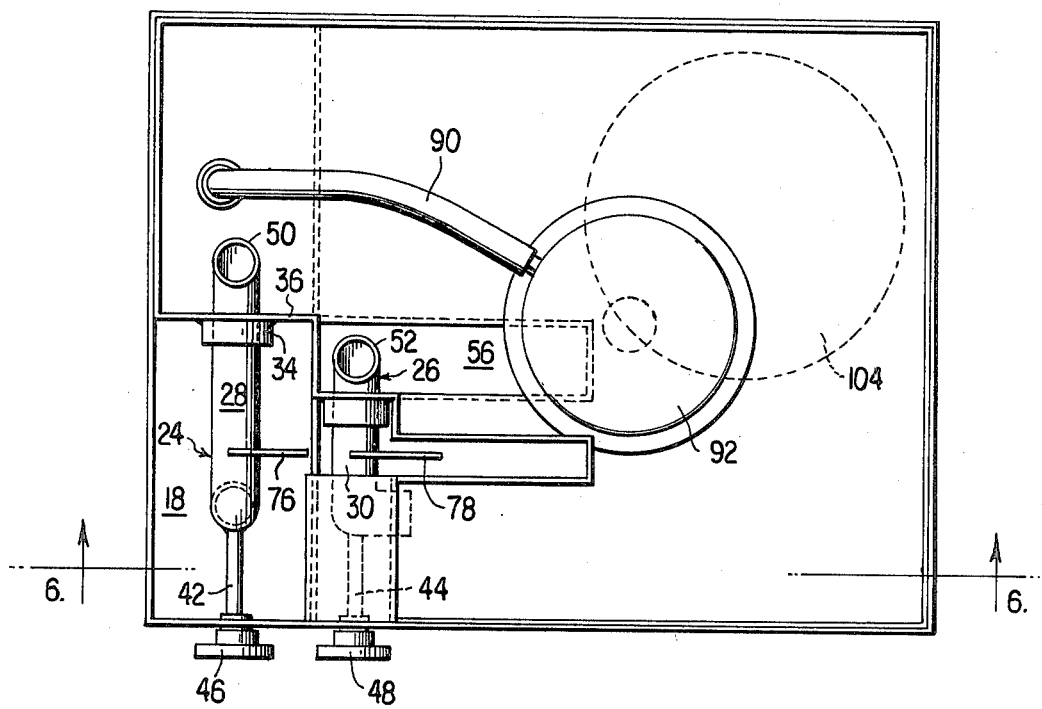
FIG. 5 is a top plan view with the upper cover removed.

Dump valves 24 and 26, best shown in FIGS. 4 and 5, comprise open ended tubes 28, 30 whose opposite ends are offset 180° and 90°, respectively. The O ring mounting and sealing of both dump valves relative to preheat tank 20 is identical and is best illustrated in the case of valve 24 shown in FIG. 4. Tube 28 is fitted with a collar 32 which has motion clearance within a journal sleeve 34 extending through wall 36 of preheat tank 20. Journal sleeve 34 is welded or otherwise secured in water tight fashion to wall 36 and is so sized relative to the bent outlet end 38 of tube 28 to permit the indicated assembly. Collar 32 and sleeve 34 are formed with mating, semicircular recesses for the receipt of O ring 40.

Operating rods 42, 44 are secured, as by welding or the like, to the bent outlet ends of tubes 28, 30 along the respective axes of rotation of the same within their respective journal sleeves. The other ends of the rods extend through a sidewall of housing 14 and are fitted with operating knobs 46, 48. Inasmuch as the location at which operating rods 42, 44 exit housing 14 is never submerged, only grommet seals need be employed between the rods and housing. The bent inlet ends 50, 52 of the dump valves are of such length as to approach the horizontal plane of top 54 of housing 14 when they are positioned in the "off" or non-dump positions illustrated in FIGS. 3 and 4. Both valves are rotatable through 90° to the full dump positions illustrated in FIG. 6. As best illustrated in FIG. 5, a well 56 is formed in preheat tank 20 into which the inlet end 52 of dump valve 26 extends when rotated to the full dump position of FIG. 6.

Dump valve 24 transfers water from preheat tank 20 to cold water reservoir 18. Dump valve 26 transfers water form preheat tank 20 to transfer tank 22. The bottom wall 58 of transfer tank 22 is formed with a central concave portion 60 through which exit, or metering holes, 62 extend.

A cold water inpour port 64 formed in housing top 54 is normally closed by a hinged door 66. Cam operators 68, 70 are secured to the undersurface of door 66 and their hooked lower ends 72, 74 coact with cam arms 76, 78 integral with tubes 28, 30. The purpose of the coacting cam operators and arms is to automatically return dump valves 24, 26 from a dump position to a closed or non-dump position as a function of door opening movement. This insures that cold water cannot be added to the coffee maker unless the dump valves are in a non-dump position.

The method of heating and transferring water from cold water reservoir 18 to preheat tank 20 is entirely conventional and may employ any of the presently known intermittent pumping systems. More specifically, cold water from reservoir 18 flows by gravity via reservoir outlet tube 80 and past check valve 82 into heater tube 84. The water volume that can be accommodated in tube 84 is heated to boiling by rod heater 86 and expelled via standpipe 88, flexible tube 90 and diffuser head 92 to exit in preheat tank 20. Following this volume expulsion from heater tube 84, additional cold water inflows from reservoir 18 and the cycle is repeated until all the water from reservoir 18 has been heated and pumped to preheat tank 20 following which time a conventional thermostat, not shown, breaks the power circuit to rod heater 86. Diffuser head 92 is of conventional construction and, in a conventional intermittent pumping ADC, comprises the hot water exit immediately into the filter basket. The diffuser head 92 as employed herein is mounted on a post 94 secured, by welding or the like, to the floor of preheat tank 20.

The electrical connections 96 to the rod heater are entirely conventional as are the connections to a conventional rope heater 98 contained in a metal housing 100 butted against the undersurface of decanter warming plate 102.

An identical rope heater and housing 104 are butted against the undersurface of preheat tank 20 and moisture sealed with respect thereto. Electrical connections 106 to housing 104 extend through reservoir 18 via standpipe 108.

The rope heaters contained in housings 100 and 104 may be activated by the same manual switch 110 although separate switches, not shown, are preferred for these two rope heaters. Input power to rod heater 86 is manually controlled by switch 112.

In the particular embodiment shown, there are twelve, 3/32 ID metering holes 62 providing a gravity flow path from transfer tank 22 to the underlying filter basket 114 which is conventionally, removably supported thereunder by coacting slide supports 116, 118.

Figure 6:
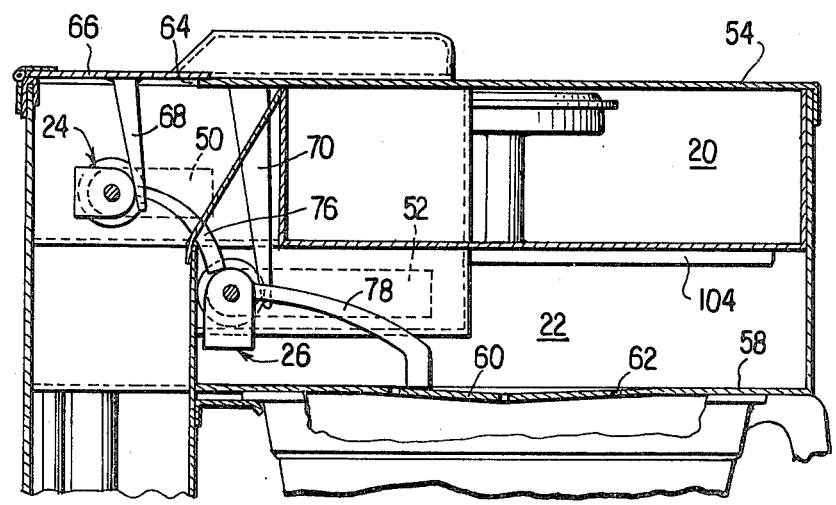
FIG. 6 is a sectional view taken along line 6—6 of FIG. 5.

Assuming a fill volume of sixty-four ounces in preheat tank 20, a full measure of coffee grounds in filter basket 114, a 3/16" ID exit flow port 119 from the filter basket and a dump valve tube ID of ½"; then upon rotating dump valve 26 to the full dump position of FIG. 6 the outflow from tank 20 to tank 22 is at such a rate as to dump all the water from tank 20, down to the upper level of well 56, in less time than is required to fill a decanter with cold water. The simultaneously outflowing rate of hot water from tank 22 to filter basket 114 considered in conjunction with the coffee outflow rate from filter basket exit port 119 is such that:

(1) The water/coffee suspension in filter basket 114 reaches a maximum volume just short of overflowing the filter basket; and
(2) The maximum volume resident in transfer tank 22 at any time is not more than approximately one-half the original volume in preheat tank 20 and, as such, does not normally rise to the level where dump valve operating rod 44 exits the preheat tank.

For reasons previously explained, it is desirable to dump all of the hot water from preheat tank 20 on each brewing cycle. In order to make ten five-ounce cups it is desirable to use approximately sixty ounces of water to take into account water that is retained with the coffee grounds. In the present invention; also taken into account is evaporation from preheat tank 20 (about two ounces over 3-4 hours, depending upon how well the cover and dump valves are sealed) and residual volume in well 56 (about two ounces). Consequently, about 64 ounces of water is normally put in reservoir 18 as may be viewed by sightglass 120. If a full decanter of coffee is to be made, no manipulation of dump valve 24 is required because it is normally immaterial whether the full decanter contains two or three ounces more or less than anticipated. If, however, less than a full decanter is to be made, dump valve 24 is rotated by knob 46 to the desired number of cups to be made as viewed on scale 122. Assuming, for simplicity of discussion, that one wishes to make four cups of coffee: knob 46 would then be rotated clockwise to the four-cup indication on scale 122 which would lower the inlet end 50 of dump valve 24 below the water surface that amount necessary to drain six cups of water from preheat tank 20 back to reservoir 18. Thereafter, when knob 48 is rotated to the full dump position (90° clockwise from the position of FIG. 1), the water needed for four cups of coffee would be dumped to the transfer tank for making the coffee and, subsequently, less cold water addition would be required to bring reservoir 18 back up to the fill mark.

Assuming less than a full decanter of coffee to have been made as discussed above, both of the dump valves will have been rotated clockwise from the dump valve closed positions of FIG. 3. Thus, cam arms 76 and 78 will have been moved downwardly from the position of FIG. 3 (cam arm 78 will have moved to the position of FIG. 6) to overlie the arcuate path of movement traversed by hooked ends 72, 74 of cam operators 68, 70 when door 66 is moved upwardly about hinge 124.

In operation, on initial cold start-up; door 66 is opened and cold water is poured directly into reservoir 18 as schematically illustrated in FIG. 2A. If either of the dump valves 24, 26 had been rotated clockwise from the closed, FIG. 1 position, the hooked ends of cam operators 68, 70 engage the undersurfaces of cam arms 76, 78 and rotate the dump valves counter clockwise to the positions shown in FIGS. 1, 2B, 3, 4 and 5 as a function of the door opening movement. Door 66 is closed. Switches 110 and 112 are energized and water from reservoir 18 is intermittently pumped to preheat tank 20 as schematically illustrated in FIG. 2B. Since both dump valves are above the preheat water level the water is retained in tank 20 where it is kept hot by the rope heater in housing 104. Rod heater 86 cuts off automatically when reservoir 18 is empty even though switch 112 remains energized. The operation of the ADC from the time of initial cold startup until the condition of FIG. 2B is obtained is somewhat less than ten minutes. Ignoring for the moment the cold water start-up procedure just described; for all subsequent uses of the ADC; its initial condition is as schematically illustrated in FIG. 2B with the preheat tank 20 filled and both dump valves closed as in FIGS. 2B and 3.

Assuming it is desired to make less than a full decanter of coffee:
(1) Dump valve 24 is rotated clockwise to the desired setting on scale 122 to dump that water in excess of the amount required back to reservoir 18 as illustrated by the position of dump valve 24 in FIG. 2C.
(2) Coffee grounds are then added to filter basket 114.
(3) A decanter is placed on warming plate 102.
(4) Dump valve 26 is rotated clockwise 90° to the full dump position schematically illustrated in FIG. 2C to commence the brew cycle as the preheat tank is dumped to the transfer tank which, in turn, meters hot water at a fast rate to the filter basket.

(5) A second decanter is filled with cold water while the preheat tank empties.

(6) Door 66 is opened which automatically restores both dump valves to the closed position of FIGS. 2B and 3.

(7) Cold water is added to reservoir 18 up to the fill line as will be seen in sightglass 120.

(8) Door 66 is closed and the manual involvement is complete.

(9) Over the next few minutes, the newly added water is pumped to the preheat tank so that the ADC is again ready to make coffee.

The time requirement for the above mentioned manual involvement is the same as for any ADC (approximately one-minute) but the difference is that the decanter will be half-filled with coffee by the time door 66 is closed. Thus the "waiting" time for coffee is about 1½-2 minutes as opposed to the next fastest ADC which is 2½-3 minutes.

In most cases, the user will want to make a full decanter of coffee in which event dump valve 24 is not rotated, i.e., step 1, above, is eliminated.

At the end of the day, the switches are deenergized, an empty decanter is placed on plate 102 and dump valve 26 is rotated to the full dump position to drain all the water from the coffee maker.

An important feature of the disclosed ADC is its convertability from a preheat type ADC to a conventional intermittent pumping type ADC. This is desirable if only one decanter of coffee is to be made in a day. Thus if a person only drinks coffee for breakfast there would be no need to keep a volume of preheated water for the remainder of the day.

To use the ADC herein disclosed in the manner of a conventional ADC, it is only necessary to rotate dump valve 26 to the full dump position before energizing switch, 112. The water will then be intermittently pumped to tank 20 from which it will intermittently flow by gravity through tube 30 to transfer tank 22 and through holes 62 to the filter basket. When using the coffee maker in this fashion, switch 110 should be energized before the coffee grounds and cold water are added to allow additional time for the rope heater in housing 104 to preheat the tanks through which the intermittently pumped water will flow.

I claim:

1. In an automatic drip coffee maker having housing means supporting a filter basket in upper spaced relation to a decanter warming plate, the improvement comprising; said housing means including preheat and transfer tanks; means including a cold water inpour port for introducing water from outside said coffee maker to said preheat tank; heating means within said coffee maker for heating said water and maintaining the same at an elevated temperature; flow control means for selectively retaining water in said preheat tank and dumping water from said preheat tank to said transfer tank; and metering means for metering water from said transfer tank to said filter basket.

2. The coffee maker of claim 1 wherein said housing means includes a cold water reservoir; and said inpour port opening into said cold water reservoir.

3. The coffee maker of claim 2 wherein said means for introducing water from outside said coffee maker to said preheat tank further includes intermittent pumping means comprising said heating means and conduit means for transferring said water from said cold water reservoir to said preheat tank.

4. The coffee maker of claim 3 wherein said flow control means comprise an open ended tube having a central portion thereof extending through a wall of said preheat tank and an inlet end portion, angularly related to said central portion, opening into said preheat tank and the opposite, outlet end portion opening into said transfer tank; and means mounting said inlet end of said tube for selective movement thereof between first and second positions respectively adjacent the upper and lower levels of said preheat tank whereby on/off flow control may be effected by selective movement of said inlet end.

5. The coffee maker of claim 1 wherein said flow control means comprise an open ended tube extending through a wall of said preheat tank and having inlet and outlet ends opening into said preheat tank and said transfer tank, respectively; and means mounting said tube for selective movement of said inlet end between a first position with the open inlet end thereof adjacent the top of said preheat tank to extend above a fill water level therein and a second position with the open inlet end thereof adjacent the bottom of said preheat tank whereby on/off flow control is effected by selective movement of said inlet end between said first and second positions.

6. A coffee maker as in claim 5 in which said metering means comprise a plurality of holes in the floor of said transfer tank; and the cross section of said open ended tube comprising said flow control means being large as compared with the aggregate cross section of said holes comprising said metering means whereby water in said preheat tank may be dumped to said transfer tank at a faster flow rate than water is metered to said filter basket.

7. A coffee maker as in claim 5 in which said tube mounting means comprises an O ring sealingly interposed between said wall of said preheat tank and a central portion of said tube; and said inlet end of said tube being angularly related to said central portion thereof.

8. A coffee maker as in claim 5 including second flow control means for dumping water from said preheat tank back to said cold water reservoir.

9. The coffee maker of claim 1 including a door for opening and closing said cold water inpour port; means connected to said flow control means for moving the same to a first position for dumping water in said preheat tank to said transfer tank; and coacting means respectively connected to said door and to said flow control means for moving said flow control means to a second position for retaining water in said preheat tank as a function of opening movement of said door.

* * * * *